US012533884B2

(12) United States Patent
Yoda et al.

(10) Patent No.: US 12,533,884 B2
(45) Date of Patent: Jan. 27, 2026

(54) PRINTING DEVICE

(71) Applicant: SEIKO EPSON CORPORATION, Tokyo (JP)

(72) Inventors: Tomohiro Yoda, Matsumoto (JP); Hiroyuki Nakayama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 180 days.

(21) Appl. No.: 18/490,801

(22) Filed: Oct. 20, 2023

(65) Prior Publication Data

US 2024/0131844 A1 Apr. 25, 2024
US 2024/0227398 A9 Jul. 11, 2024

(30) Foreign Application Priority Data

Oct. 20, 2022 (JP) ................................ 2022-168168

(51) Int. Cl.
*B41J 2/145* (2006.01)
*B41J 11/00* (2006.01)

(52) U.S. Cl.
CPC ........... *B41J 2/145* (2013.01); *B41J 11/0022* (2021.01); *B41J 11/0024* (2021.01)

(58) Field of Classification Search
CPC . B41J 11/0022; B41J 2/01; B41J 2/165; B41J 2/145; B41J 11/0024
USPC .................................................. 347/101, 102
See application file for complete search history.

(56) References Cited

U.S. PATENT DOCUMENTS

2009/0002468 A1* 1/2009 Ito .............................. B41J 2/19 347/92
2021/0101387 A1* 4/2021 Kato .................... B41J 2/16535

FOREIGN PATENT DOCUMENTS

JP 2006-248133 A 9/2006
KR 100402794 B1 * 10/2003 .......... B41J 11/0022
WO WO2008/149759 A 12/2008

OTHER PUBLICATIONS

KR 100402794 B1 machine translation Kipris (Year: 2003).*

* cited by examiner

*Primary Examiner* — Leslie J Evanisko
*Assistant Examiner* — Thomas Ray Knief
(74) *Attorney, Agent, or Firm* — Dority & Manning, P.A.

(57) ABSTRACT

A printing device includes a head unit that includes a nozzle and that ejects liquid from the nozzle toward a medium; a heating section that heats the medium to which the liquid was applied; and a head unit moving section configured to move the head unit, wherein the head unit includes a gas guiding section that guides air flow generated by the movement of the head unit toward the medium.

8 Claims, 12 Drawing Sheets

PRINTING DEVICE

The present application is based on, and claims priority from JP Application Serial Number 2022-168168, filed Oct. 20, 2022, the disclosure of which is hereby incorporated by reference herein in its entirety.

BACKGROUND

1. Technical Field

The present disclosure relates to a printing device.

2. Related Art

In the related art, as shown in PCT-2008/149759, a recording apparatus is known which is provided with a carriage unit including an ink jet head, a carriage on which the ink jet head is mounted, and a fan which forcibly causes air floating over the recording medium to flow. In the recording apparatus, the air is caused to flow by driving the fan so that the vapor of the ink applied onto the recording medium is drawn away from the ink jet head.

However, in the recording apparatus, it is necessary to transmit electric power and a signal for driving the fan to the carriage, and thus there is a problem in that the configuration of the carriage unit is complicated.

SUMMARY

A printing device includes a head unit that includes a nozzle and that ejects liquid from the nozzle toward a medium; a heating section that heats the medium to which the liquid was applied; and a head unit moving section configured to move the head unit, wherein the head unit includes a gas guiding section that guides air flow generated by the movement of the head unit toward the medium.

DESCRIPTION OF EMBODIMENTS

1. First Embodiment

First, configuration of the printing device 1 will be described. The printing device 1 of the present embodiment is a serial type large format printer that performs printing on a medium M by ejecting ink as liquid.

Hereinafter, an XYZ coordinate system is used in each drawing. A direction along the Z axis is a height direction of the printing device 1. A direction along the X axis is a width direction of a medium M being transported. A direction along the X axis is referred to as a width direction or a scanning direction. A direction along the Y axis is a front-rear direction of the printing device 1.

The front side of the printing device 1 is in a +Y direction, and a rear side of the printing device 1 is in a −Y direction. On the Y axis, the +Y direction and the −Y direction indicate opposite directions. When the printing device 1 is viewed from the front side, the left side is the +X direction, and the right side is the −X direction. On the X axis, the +X direction and the −X direction indicate opposite directions. The upper side, upward, upper section, upper surface, and the like of the printing device 1 are the +Z direction, and the lower side, downward, lower section, lower surface, and the like are the −Z direction. With respect to the Z axis, the +Z direction and the −Z direction indicate opposite directions.

The medium M is transported from the feeding section 20 (to be described later) toward the winding section 60. A direction in which the medium M is transported is referred to as a transport direction F. When referring to a positional relationship along the transport direction F of the medium M, the feeding section 20 side is referred to as an upstream side and the winding section 60 side is referred to as a downstream side.

Figure 1:
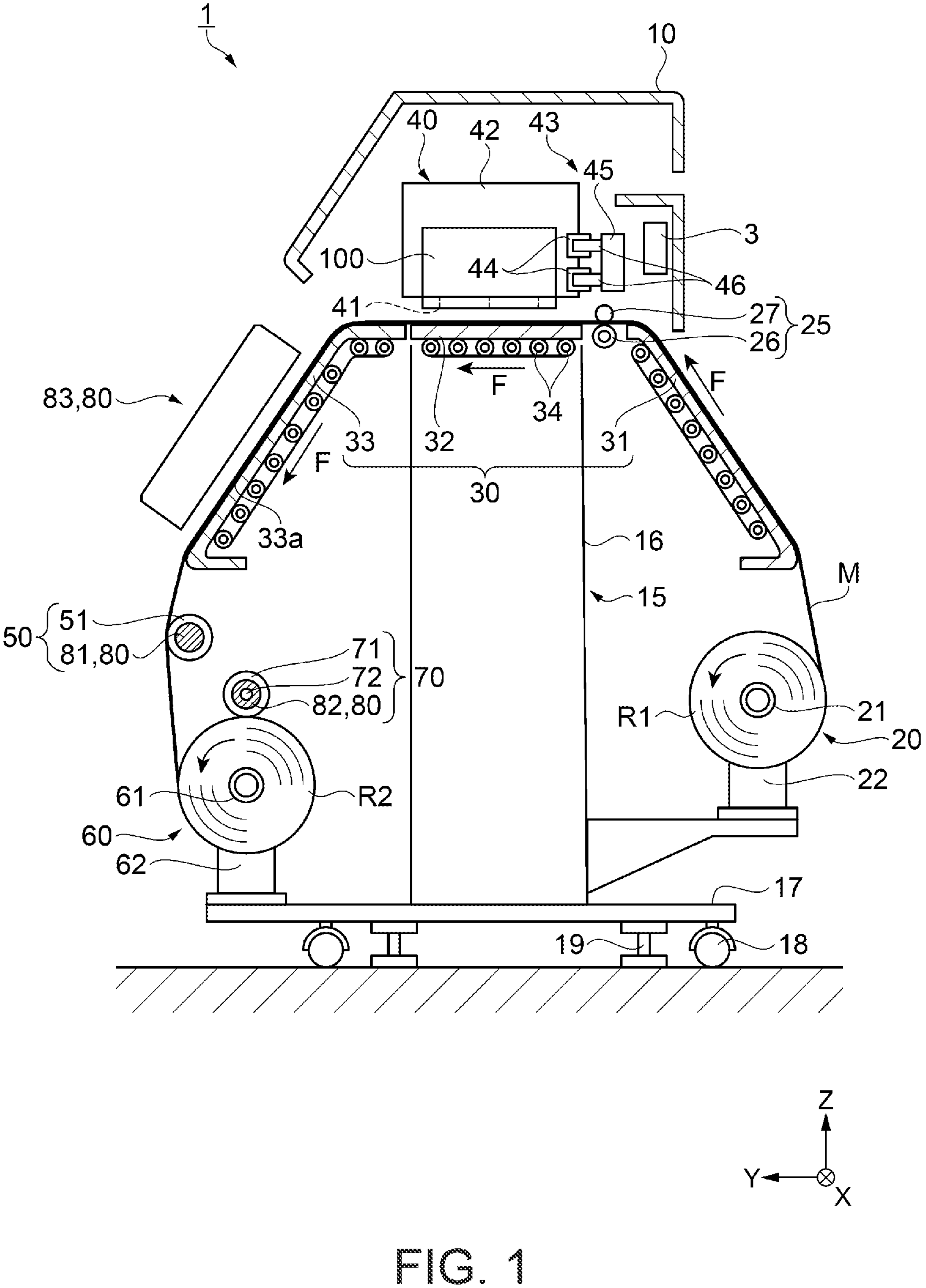
FIG. 1 is a schematic diagram showing configuration of a printing device according to a first embodiment.

As illustrated in FIG. 1, the printing device 1 includes a frame 15, a feeding section 20, transport rollers 25, a support section 30, a head unit 40, a heating section 34, a guide section 50, a winding section 60, a pressing roller 70, a heater 80, a control section 3, and the like. The frame 15 includes a base frame 16 that extends in the width direction and a pair of leg frames 17 that extend in the front-rear direction integrally with the base frame 16, that receive the weight of the printing device 1, and that are formed at an interval in the width direction.

The control section 3 includes a CPU, a memory, a control circuit, and an interface (I/F). The CPU is an arithmetic processing section. The memory 52 is a storage device that secures an area for storing various programs, a work area, or the like, and includes a storage element such as RAM and EEPROM. When print data or the like is acquired from an information processing terminal or the like via the I/F, the CPU executes calculations in accordance with various programs and controls each drive section or the like via the control circuit.

The heater 80 includes a first heater 81, a second heater 82, and a third heater 83, which will be described in detail later. By driving the heater 80 and heating the printed medium M, the deposited ink is quickly dried and fixed to the medium M, and bleeding and blurring are suppressed. The first heater 81 and the second heater 82 suppress cockling by correcting to flatten out medium M that was swollen and deformed by ink.

The feeding section 20, the transport rollers 25, the support section 30, the guide section 50, the pressing roller 70, and the like are fixed to the base frame 16. The winding section 60 is fixed to the leg frame 17 or the like.

The head unit 40 is disposed inside a housing 10, which is fixed to the base frame 16 and has a substantially rectangular parallelepiped shape extending in the width direction. The control section 3 is disposed inside the housing 10 and integrally controls the operation of each section of the printing device 1.

The printing device 1 includes a pair of casters 18 and a pair of adjusters 19 at the lower end of each leg frame 17. After the printing device 1 is moved to an installation location using the casters 18, height adjustment (horizontal adjustment or the like) of the printing device 1 is performed, and the printing device 1 is fixed to, for example, a floor surface using the adjuster 19.

The feeding section 20 is provided in a lower section on the rear surface side of the housing 10. The feeding section 20 includes a pair of holders 22 that sandwich both ends of a core tube 21. The holders 22 hold a roll body R1 in which unused medium M for printing is wound in a roll shape around the core tube 21. One holder 22 is provided with a feeding motor (not shown) that supplies rotational force to the core tube 21. When the feeding motor is driven to rotate in a feeding direction (counterclockwise direction in FIG. 1), the core tube 21 is driven to rotate, and by this the medium M is fed from the roll body R1 toward the transport rollers 25. The control section 3 controls the feeding section 20 (feeding motor).

Roll bodies R1 in a plurality of sizes having different widths and numbers of winds of the medium M are replaceably loaded into the feeding section 20. A plurality of types of roll bodies R1 having different types (materials) of medium M are replaceably loaded in the feeding section 20.

The support section 30 includes a first support section 31, a platen 32, and a second support section 33. The first support section 31 is disposed at the upstream side of the platen 32. The second support section 33 is disposed at the downstream side of the platen 32. The first support section 31 guides the medium M fed from the feeding section 20 to the platen 32. The second support section 33 guides the medium M that was printed on by the head unit 40 to the guide section 50 and the winding section 60.

The platen 32 is formed to have a substantially rectangular surface whose longitudinal direction is the scanning direction and is disposed at a position facing the head unit 40 (the ejection head 41). The platen 32 supports from below the medium M that is to be printed on by the head unit 40. In detail, the platen 32 sucks and supports the medium M on the upper surface of the platen 32 by negative pressure applied to the platen 32. By this, it is possible to suppress a decrease in printing quality due to the medium M floating up.

The heating section 34 is provided to heat up the platen 32 and, by this, heat up the medium M supported by the platen 32. The heating section 34 is disposed at a surface (rear surface) side of the platen 32 that is opposite to the surface that supports the medium M. The heating section 34 is, for example, a tube heater and is attached to the back surface of the platen 32 using aluminum tape or the like. The platen 32 is heated by heat conduction by the heating section 34 and the medium M is heated from the rear side of the medium M. By this, ink applied to the medium M is dried, the ink is quickly dried and fixed to the medium M, bleeding and blurring are prevented, and image quality can be improved. The control section 3 controls the heating section 34.

Note that the first support section 31 and the second support section 33 may also be provided with a heating section 34 (for example, a tube heater) similar to the above.

The transport rollers 25 transport, in the transport direction F, the medium M that was fed from the feeding section 20. The transport rollers 25 includes a drive roller 26, a driven roller 27, and a drive motor (not shown). The drive roller 26 is provided between the first support section 31 and the platen 32. The drive roller 26 is configured to extend in a direction intersecting the transport direction F of the medium M.

The driven roller 27 is disposed to the upper side of the drive roller 26, and is configured to be movable so as to be separated from and brought into pressure contact with the drive roller 26. When the drive motor is driven and the drive roller 26 is rotationally driven, the medium M nipped between the drive roller 26 and the driven roller 27 is transported in the transport direction F. The control section 3 controls the rotation of the transport rollers 25 (drive motor).

The head unit 40 is disposed on the downstream side of the transport rollers 25 and above the platen 32. The head unit 40 includes an ejection head 41 that ejects ink toward the medium M that is supported on the upper surface of the platen 32. The head unit 40 of the present embodiment includes a plurality of (for example, ten) ejection heads 41 (FIG. 2B). The head unit 40 includes a carriage 42 that supports the ejection head 41.

Further, the head unit 40 includes a gas guiding section 100.

The ejection head 41 includes a nozzle plate 47. A plurality of nozzles 48 are formed in the nozzle plate 47. Ink is ejected from the nozzles 48 (FIG. 2B). A plurality of nozzle rows in which the nozzles 48 of each ejection head 41 are arranged are configured to be arranged in the scanning direction (direction along the X axis). The ejection heads 41 are arranged in the scanning direction for each color of ink. The control section 3 controls the operation of each ejection head 41.

The head unit 40 is configured to be movable in the scanning direction by the head unit moving section 43. The head unit moving section 43 includes a carriage frame 45, carriage shafts 46, bearings 44, a carriage motor (not shown), and the like.

The carriage 42 is reciprocably supported by two carriage shafts 46 which are installed in a carriage frame 45 and extend in the width direction. The carriage 42 and the carriage shafts 46 of this embodiment are engaged with each other via two bearings 44 fixed to the carriage 42. The carriage 42 is moved along the carriage shafts 46 by a carriage motor. The bearings 44 are configured as so-called ball bearings. The control section 3 controls the operation of the head unit moving section 43 (carriage motor).

In the printing device 1 of the embodiment, dots are formed on the medium M and a predetermined image is printed on the medium M by alternately repeating an ejecting operation of ejecting ink as ink droplets from the ejection head 41 while moving the ejection head 41 in the scanning direction and a transport operation of transporting the medium M by a predetermined amount in the transport direction F by the transporting rollers 25.

The winding section 60 is arranged on the downstream side of the guide section 50 (to be described later). The winding section 60 includes a pair of holders 62 that sandwich both ends of a core tube 61. A roll body R2 formed by winding medium M that was printed on by the head unit 40 around the core tube 61 is held by the holders 62. One of the holders 62 is provided with a winding motor (not shown) that supplies rotational force to the core tube 61. When the winding motor is driven to rotate in a winding direction (counterclockwise direction in FIG. 1), the core tube 61 is driven to rotate and, by this, the medium M passing through the guide section 50 is wound around the core tube 61 to form the roll body R2.

Note that under the control of the control section 3, the winding section 60 of the present embodiment winds the medium M in synchronization with the transport operation of the transport rollers 25. The torque of the roll body R2 is optimized and the tensile force of the medium M is adjusted according to the speed at which the medium M is fed out, the inertia (inertia moment) of the winding section 60, the type of the medium M, the printing conditions during printing, the environmental conditions, and the like.

The guide section 50 is disposed on the downstream side of the second support section 33 and on the upstream side of the winding section 60, and guides the printed medium M toward the winding section 60. The guide section 50 includes a cylindrical section 51 which has a hollow cylindrical shape and is formed to be longer than the length of the medium M in the width direction, and a first heater 81 which is installed inside the cylindrical section 51. The guide section 50 is installed on the base frame 16 with both end sections of the cylindrical section 51 supported and fixed by a holding section (not shown).

The guide section 50 of the present embodiment does not rotate. In the guide section 50, a guide surface, which is an outer circumferential surface on the front side of the cylindrical section 51, contacts the medium M and an appropriate tension is applied to the medium M that was printed on and that is being transported in the transport direction F by the driving of the winding section 60. Therefore, the medium M after printing slides and is transported past the guide section 50 while being applied with a predetermined tension by the outer circumferential surface at the front side of the cylindrical section 51. Note that the cylindrical section 51 of the guide section 50 contacts a surface of the printed on medium M opposite to the printed surface.

The tension applied to the medium M by the guide section 50 is generated by a winding force (rotational force) supplied to the core tube 61 by the winding motor of the winding section 60. In other words, the control section 3 adjusts the tension applied to the medium M by the guide section 50 by controlling the winding force of the winding section 60 (specifically, by controlling the winding motor).

The material of the cylindrical section 51 may be, for example, aluminum, which is a metal member having good thermal conductivity. Therefore, it is possible to efficiently transfer the heat generated from the first heater 81 installed inside the cylindrical section 51 to the medium M. The outer peripheral surface of the aluminum is subjected to a surface treatment such as an alumite treatment in order to improve strength and corrosion resistance and to improve wear resistance and smoothness.

The first heater 81 is, for example, an infrared heater that performs heating with infrared rays or far infrared rays. As the first heater 81, in addition to the infrared heater, for example, a sheath heater having a heating element (nichrome wire) therein or a ceramic heater using ceramics as a heating element can be used. The first heater 81 is connected to a heating drive section (not shown) disposed to the outside of the guide section 50. The first heater 81 is heated by drive of the heating drive section, the cylindrical section 51 is heated from the inside of the cylindrical section 51, and the medium M that contacts the outer circumferential surface of the cylindrical section 51 can be heated. The control section 3 adjusts the heating temperature of the first heater 81 by controlling the heating drive section.

The pressing roller 70 is installed above the roll body R2 of the winding section 60 and is rotated by rotation of the winding section 60. The pressing roller 70 includes a roller section 71, which has a cylindrical shape and is formed to be longer than the length of the medium M in the width direction, a rotation shaft 72, which rotates the roller section 71, and a second heater 82, which is installed inside the roller section 71.

The pressing roller 70 includes a pressing mechanism (not shown). The pressing mechanism rotatably holds the rotation shaft 72 of the pressing roller 70 and also rotatably supports both end sections of the roller section 71, brings the roller section 71 into contact with the roll body R2, and presses the wound medium M. The control section 3 can adjust the pressing force applied to the roll body R2 by controlling the pressing mechanism.

Specifically, the pressing roller 70 presses the outer circumferential surface of the medium M wound around the winding section 60. The pressing roller 70 heats the outer circumferential surface of the medium M using the second heater 82. In the embodiment, the outer circumferential surface of the medium M to be heated is the surface opposite to the surface heated by the guide section 50. In this way, the pressing roller 70 presses the outer circumferential surface of the medium M wound around the winding section 60 while heating the outer circumferential surface. Note that the roller section 71 of the pressing roller 70 is rotated by the rotation of the winding section 60.

The material of the roller section 71 can be, for example, aluminum, which is a metal member having good thermal conductivity. Therefore, it is possible to efficiently transfer heat generated by the second heater 82 installed inside the roller section 71 to the medium M. The outer peripheral surface of aluminum is subjected to a surface treatment such as alumite treatment.

Similarly to the first heater 81, the second heater 82 is, for example, an infrared heater that performs heating using infrared rays or far infrared rays. The second heater 82 is connected to a heating drive section disposed to the outside of the pressing roller 70. The second heater 82 is heated by drive of the heating drive section, the roller section 71 is heated from the inner side of the roller section 71, and it is possible to heat the medium M that contacts the outer circumferential surface of the roller section 71. The control section 3 adjusts the heating temperature by controlling the second heater 82 (heating drive section). The control section 3 adjusts the pressing force by controlling the pressing mechanism.

The third heater 83 is disposed in between the head unit 40 and the guide section 50 and faces the second support section 33, which supports the medium M after printing. The third heater 83 heats the support surface 33*a* of the second support section 33 that supports the medium M and the medium M supported by the support surface 33*a*. The third heater 83 includes an infrared heater, a housing, a duct, a suction fan, and the like.

The third heater 83 faces the medium M that is being transported while being supported by the support surface 33*a* of the second support section 33, and heats the medium M from the print surface side to dry and fix the ink. The control section 3 controls the third heater 83.

Next, configuration of the gas guiding section 100 will be described.

The head unit 40 includes the gas guiding section 100. The gas guiding section 100 guides air flow that was generated by movement of the head unit 40, toward the medium M supported by the platen 32.

Figure 2A:
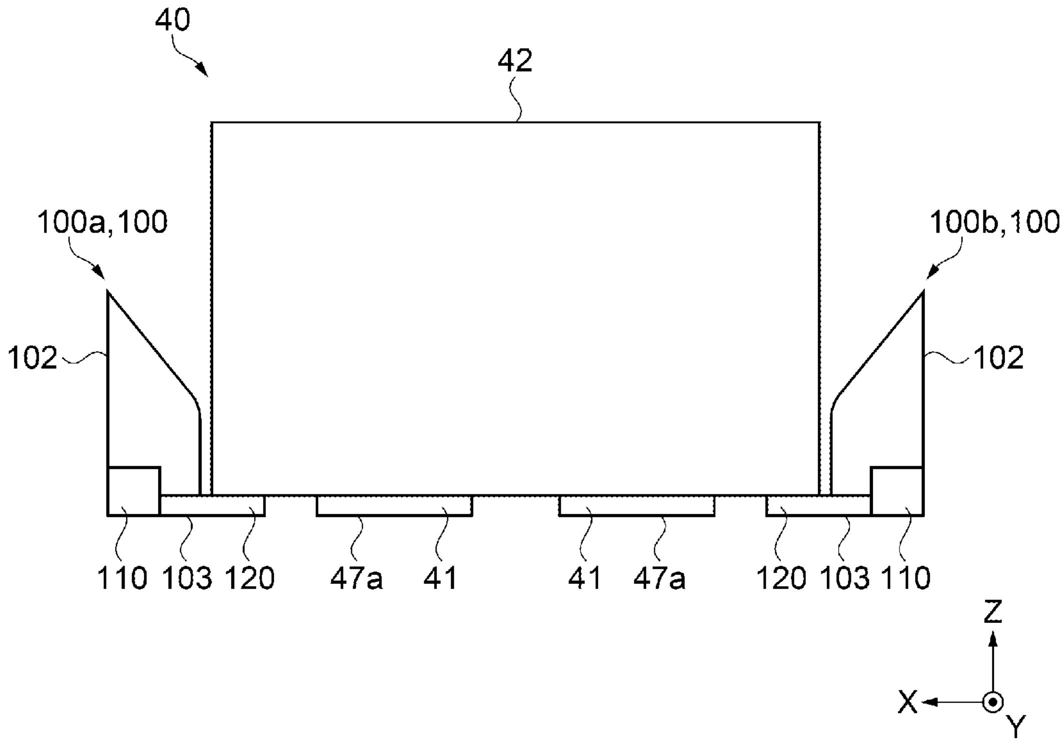
FIG. 2A is a front view showing configuration of a gas guiding section according to the first embodiment.
Figure 2B:
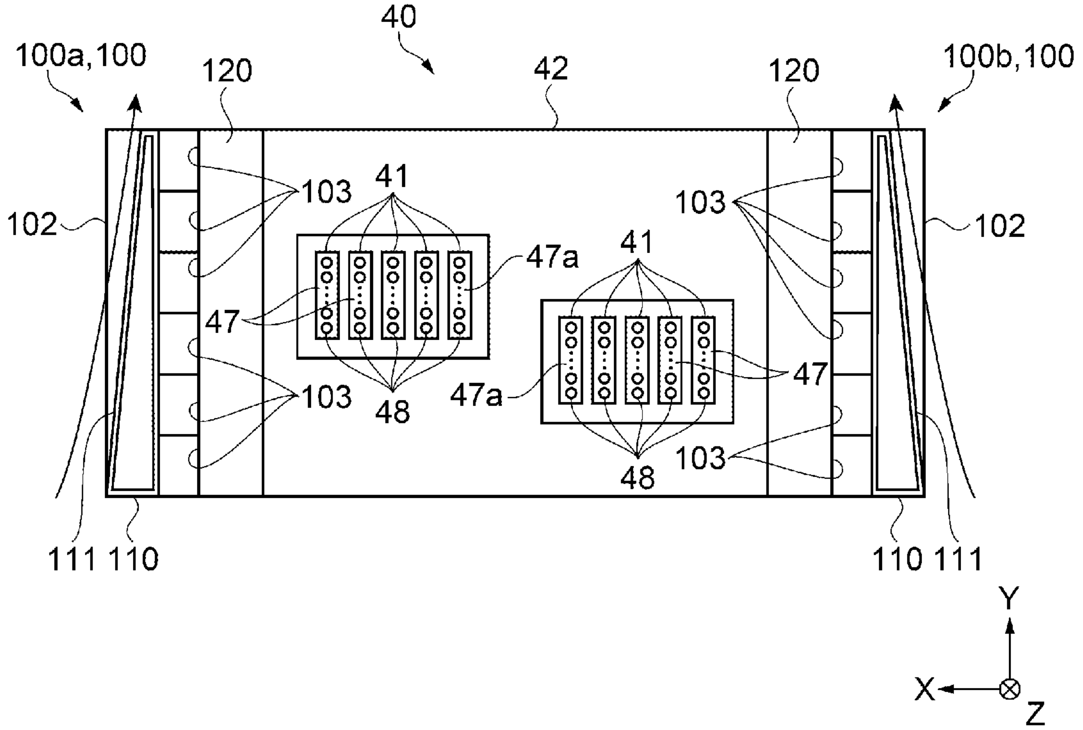
FIG. 2B is a bottom view showing configuration of the gas guiding section according to the first embodiment.

As shown in FIG. 2A, the head unit 40 includes two gas guiding sections 100. To be specific, the head unit 40 is provided with a first gas guiding section 100*a* which is provided at an end section in the +X direction (first direction) of the carriage 42, and a second gas guiding section 100*b* which is provided at an end section in the −X direction (second direction). The basic configurations of the first gas guiding section 100*a* and the second gas guiding section 100*b* are the same.

Figure 2C:
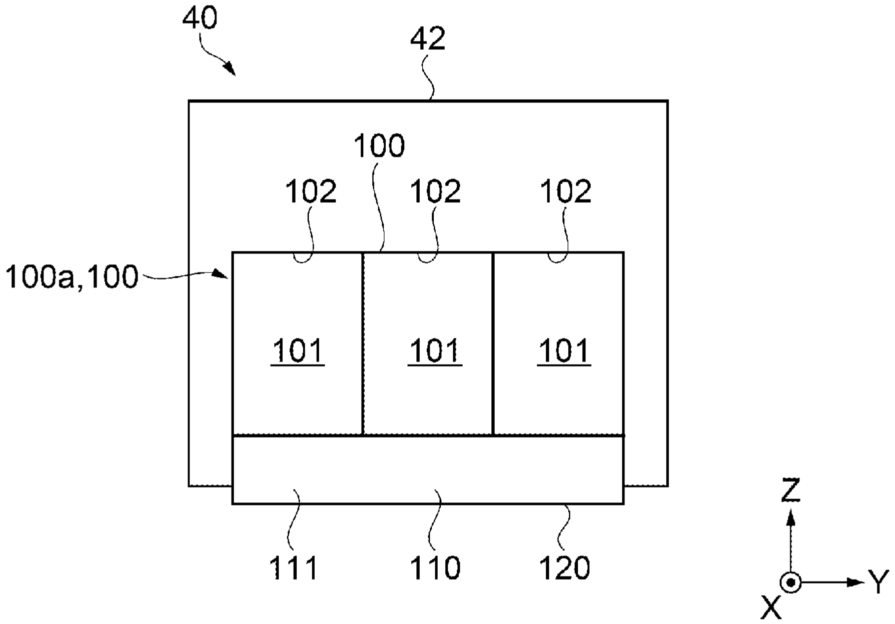
FIG. 2C is a side view showing configuration of the gas guiding section according to the first embodiment.
Figure 2D:
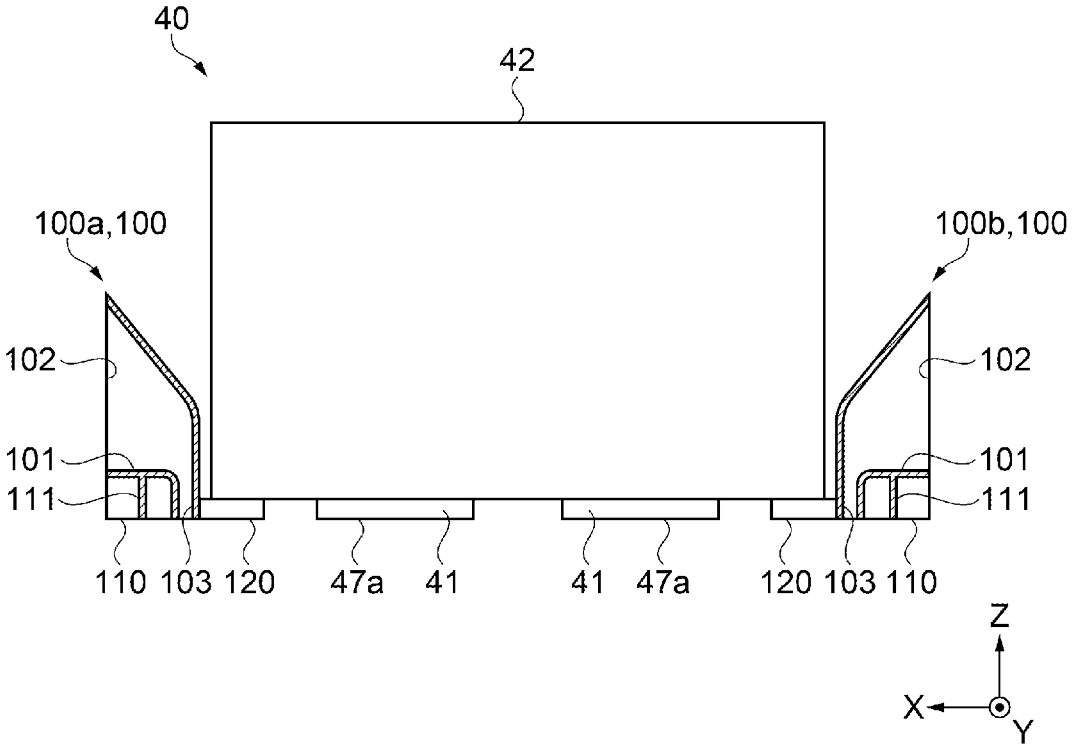
FIG. 2D is a cross-sectional view showing configuration of the gas guiding section according to the first embodiment.

As shown in FIG. 2C and FIG. 2D, the first gas guiding section 100*a* and the second gas guiding section 100*b* include a flow path 101 through which gas (for example, air) flows. An inflow port 102 into which the gas flows when the head unit 40 moves is disposed at one end of the flow path 101. An outflow port 103 through which the gas that flowed in from the inflow port 102 is discharged is disposed at the other end of the flow path 101. The flow path 101 is a guide path that guides the gas from the inflow port 102 toward the outflow port 103.

The inflow port 102 has a rectangular shape as viewed in the −X direction (FIG. 2C). The inflow port 102 is divided into, for example, a plurality of (for example, three) sections. The outflow port 103 has a rectangular shape as viewed in the +Z direction (FIG. 2B). For example, the outflow port 103 is divided into a plurality of (for example, six) sections.

The inflow port 102 opens in the movement direction in which the head unit 40 moves. To be specific, the inflow port 102 of the first gas guiding section 100*a* is opened toward the +X direction. The inflow port 102 of the second gas guiding section 100*b* opens in the −X direction.

The outflow port 103 opens toward the medium M. That is, the outflow port 103 is opened toward the platen 32 side (−Z direction).

The inflow port 102 is disposed ahead of the outflow port 103 in the movement direction. To be specific, in the first gas guiding section 100*a*, the inflow port 102 is arranged further in the +X direction than is the outflow port 103. On the other hand, in the second gas guiding section 100*b*, the inflow port 102 is arranged further in the −X direction than is the outflow port 103. By this, it is possible to efficiently perform the inflow operation and the outflow operation of the gas. The flow path 101 of the present embodiment bends from a direction along the X axis toward a direction along the Z axis from the inflow port 102 toward the outflow port 103. Therefore, gas flowing in from the direction along the X axis via the inflow port 102 flows through the flow path 101 and is guided toward the −Z direction from the outflow port 103.

The opening area of the inflow port 102 is larger than the opening area of the outflow port 103. In the present embodiment, for example, in the first gas guiding section 100*a* and the second gas guiding section 100*b*, the entire opening area of the three inflow ports 102 is larger than the entire opening area of the six outflow ports 103. The flow path 101 of the present embodiment is constricted and narrowed during the path from the inflow port 102 to the outflow port 103. That is, the cross-sectional opening area when the flow path 101 is cut in a direction intersecting the direction of the air flow is larger at a position closer to the inflow port 102 than at a position closer to the outflow port 103. For example, the ratio of the entire area of the outflow port 103 to the entire area of the inflow port 102 is about 10% to 30%. By this, the speed of the air flow flowing out from the outflow port 103 can be increased.

The first gas guiding section 100*a* and the second gas guiding section 100*b* include an air flow control section 110 that is disposed below the inflow port 102 and that is for controlling the direction of air flow generated by movement of the head unit 40.

As shown in FIG. 2B, the air flow control section 110 is disposed between the inflow port 102 and the outflow port 103. The air flow control section 110 includes an inclined surface 111 which is inclined with respect to the movement direction (scanning direction) of the head unit 40. The inclined surface 111 functions as a control surface that controls the direction of air flow generated when the head unit 40 moves. The inclined surface 111 forms a flat surface. In the present embodiment, the inclined surface 111 of the first gas guiding section 100*a* is a surface spanning the −Y direction end section to the +Y direction end section of the first gas guiding section 100*a*, and is a surface extending so that the +Y direction end section side approaches closer to the outflow port 103 than does the −Y direction end section side. The inclined surface 111 of the second gas guiding section 100*b* is a surface spanning the −Y direction end section to the +Y direction end section of the second gas guiding section 100*b*, and is a surface extending so that the +Y direction end section side approaches closer to the outflow port 103 than does the −Y direction end section side.

For example, in a case where the head unit 40 is moved in the scanning direction, gas at the front in the movement direction collides with the inclined surface 111, and the direction of air flow is regulated and controlled in the +Y direction.

Note that the direction of the inclined surface 111 may be reversed. That is, the inclined surface 111 of the first gas guiding section 100*a* may be a surface extending such that the +Y direction end section side is separated further away from the outflow port 103 than is the −Y direction end section side, and the inclined surface 111 of the second gas guiding section 100*b* may be a surface extending such that the +Y direction end section side is separated further away from the outflow port 103 than is the −Y direction end section side. In this case, when the head unit 40 is moved in the scanning direction, gas at the front in the movement direction collides with the inclined surface 111, and the direction of air flow is regulated and controlled in the −Y direction.

The first gas guiding section 100*a* and the second gas guiding section 100*b* have a guard section 120 which protects a nozzle surface 47*a*, which is a surface of the nozzle plate 47 in which the nozzles 48 are formed. The nozzle surface 47*a* is a −Z direction end surface of the nozzle plate 47. The guard section 120 is a block body which protrudes in the −Z direction from the −Z direction end section of the carriage 42. The guard section 120 is disposed in the −X direction and in the +X direction of the ejection head 41. That is, the guard section 120 is disposed at the −X direction end section and at the +X direction end section of the carriage 42.

The guard section 120 is disposed at substantially the same height position as the nozzle surface 47*a*. That is, the position of the −Z direction end section of the nozzle surface 47*a* and the position of the −Z direction end section of the guard section 120 are substantially the same. Note that it is desirable that the position of the −Z direction end section of the guard section 120 is positioned slightly in the −Z direction from the position of the −Z direction end section of the nozzle surface 47*a*.

When the head unit 40 moves in the scanning direction, since the guard section 120 is disposed on the front side (downstream side) in the movement direction of the ejection head 41, for example, in a case where there is foreign matter or the like, the foreign matter or the like collides with the guard section 120 first, and thus it is possible to protect the ejection head 41.

Note that the guard sections 120 of the present embodiment are formed integrally with the first gas guiding section 100*a* and the second gas guiding section 100*b*. By this, it is possible to simplify the configuration of the head unit 40. The guard sections 120 are formed at the −Z direction end sections of the first gas guiding section 100*a* and the second gas guiding section 100*b*. The height position of the −Z direction end section of the flow path 101 forming the outflow port 103 is the same as the position of the −Z direction end section of the guard section 120. Furthermore, the height position of the −Z direction end section of the air flow control section 110 is the same as the position of the −Z direction end section of the guard section 120. That is, the −Z direction end section of the flow path 101 and the −Z direction end section of the air flow control section 110 also function to protect the ejection head 41 (the nozzle surface 47*a*), similarly to the guard sections 120.

Next, the operation and effect of the gas guiding section 100 will be described.

When the control section 3 acquires print data or the like from an information processing terminal or the like via the I/F, the control section 3 controls each driving section or the like according to various programs.

Specifically, the control section 3 transports the medium M in the transport direction F. Then, ink is ejected from the ejection head 41 while the head unit 40 is moved in the scanning direction with respect to the medium M supported by the platen 32. By this, an image or the like is printed on the medium M. The control section 3 drives the heating section 34, heats the medium M during printing via the platen 32, and dries the ink applied to the medium M.

Here, by drying the ink applied to the medium M, vapor of a component evaporated from the ink floats over the medium M. The ejection head 41 becomes exposed to an atmosphere having a high relative humidity by moving over the medium M. When the temperature of the nozzle surface 47*a* is low, dew condensation of the component evaporated from the ink may occur on the nozzle surface 47*a* and nozzle omissions may occur due to the nozzles 48 clogging.

Therefore, in the head unit 40 (the first gas guiding section 100*a* and the second gas guiding section 100*b*) of the embodiment, generation of the condensation on the nozzle surface 47*a* is suppressed by blowing away vapor generated when the ink is dried.

Figure 3A:
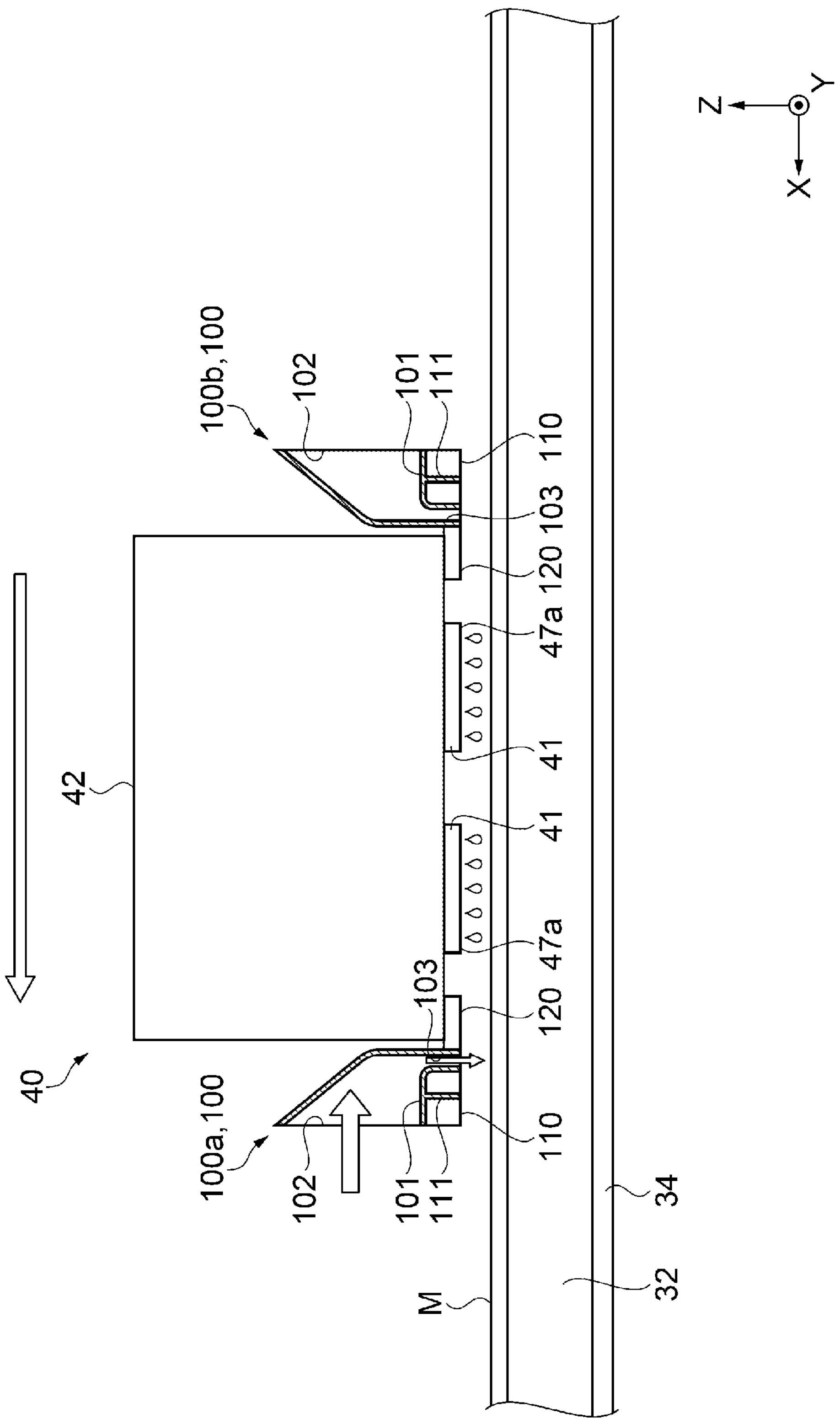
FIG. 3A is a schematic diagram showing operation of the gas guiding section according to the first embodiment.

As shown in FIG. 3A, in a case where the head unit 40 is moved in the +X direction, gas flows in from the inflow port 102 of the first gas guiding section 100*a*, passes through the flow path 101, and flows out from the outflow port 103. That is, the air flow generated by movement of the head unit 40 is guided toward the medium M. The gas flowing out from the outflow port 103 hits the vapor over the medium M, and the vapor is dispersed and moved.

It is possible to easily blow the gas toward the medium M side with a simple configuration that uses the movement of the head unit 40 in the scanning direction. By this, since it is possible to reduce the amount of vapor in the space interposed between the medium M and the head unit 40 by moving the evaporated component that is over the medium M, it is possible to suppress the occurrence of dew condensation on the nozzle surface 47*a*.

Since the inflow port 102 is opened in the +X direction, the gas can efficiently be made to flow in. Since the outflow port 103 is opened in the −Z direction, the gas can be efficiently blown toward the vapor generated when the ink is dried.

The outflow port 103 is disposed on the +X direction side of the ejection head 41. That is, the outflow port 103 is disposed on the front side in the movement direction of the ejection head 41 in movement of the head unit 40 in the +X direction, therefore with respect to a point through which the ejection head 41 is about to pass, it is possible to move the vapor using the first gas guiding section 100*a* before the ejection head 41 passes through.

The area of the outflow port 103 is smaller than the area of the inflow port 102. By this, the speed of the air flow flowing out from the outflow port 103 increases, and the vapor around the ejection head 41 can be efficiently blown off.

Figure 3B:
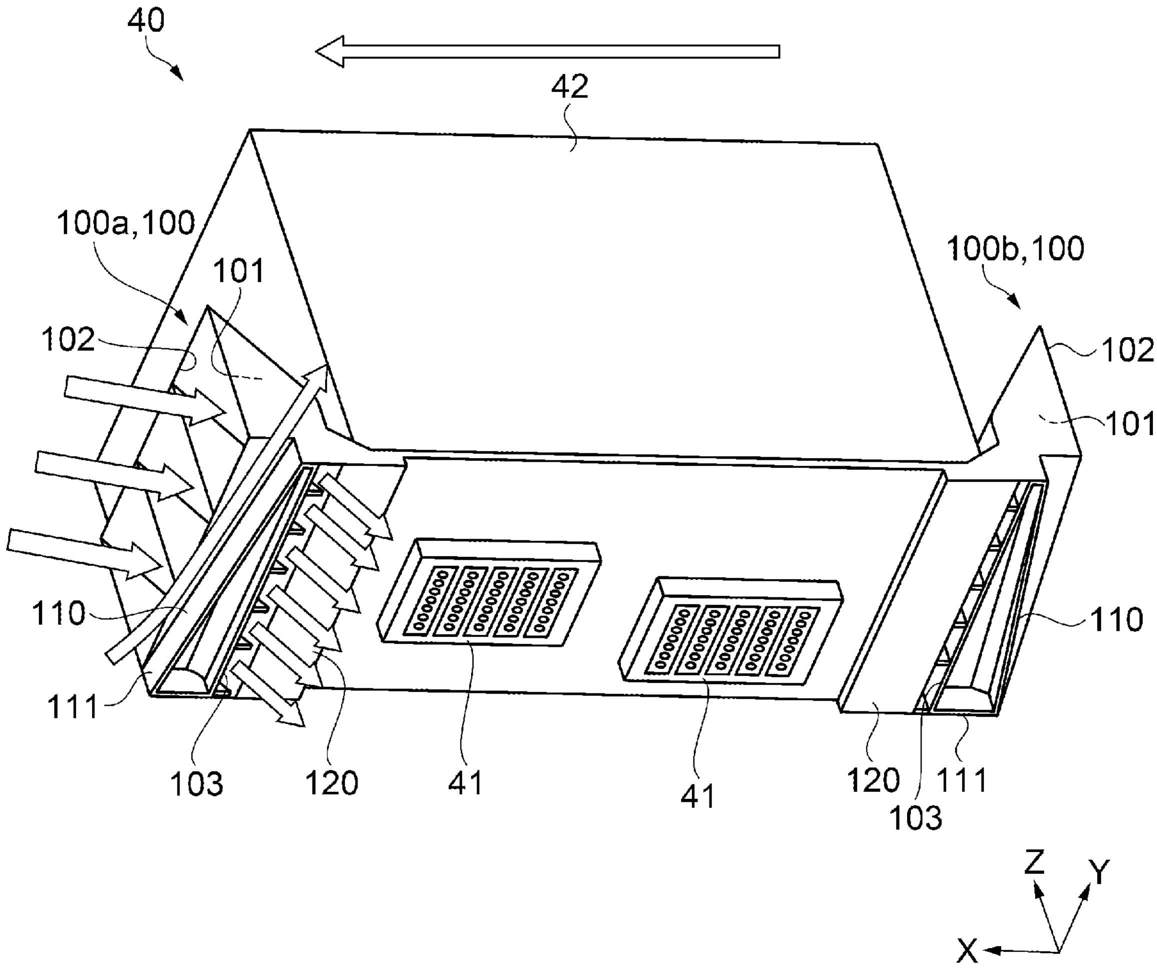
FIG. 3B is a schematic diagram showing operation of the gas guiding section according to the first embodiment.

Further, as shown in FIG. 3B, while the head unit 40 moves, the vapor floating over the medium M is scooped out by the air flow control section 110 from the region where the head unit 40 moves, in the direction intersecting the scanning direction. Therefore, it is possible to suppress the inflow of the gas containing vapor from the inflow port 102. Clinging of vapor to the vicinity of the inflow port 102 can be suppressed. It is possible to suppress vapor from clinging to the periphery of the outflow port 103.

The air flow is guided to the transport direction F side by the air flow control section 110. For example, in a case where an image is formed by a plurality of scans (a plurality of passes) of the head unit 40 in a printing process, since the application amount of ink is greater on the downstream side in the transport direction F, the gas containing a larger amount of evaporated component is likely to drift and accumulate on the downstream side in the transport direction F. Therefore, by regulating the scooping direction of the gas on the downstream side in the transport direction F, it is possible to more efficiently scoop out the evaporated component.

Figure 3C:
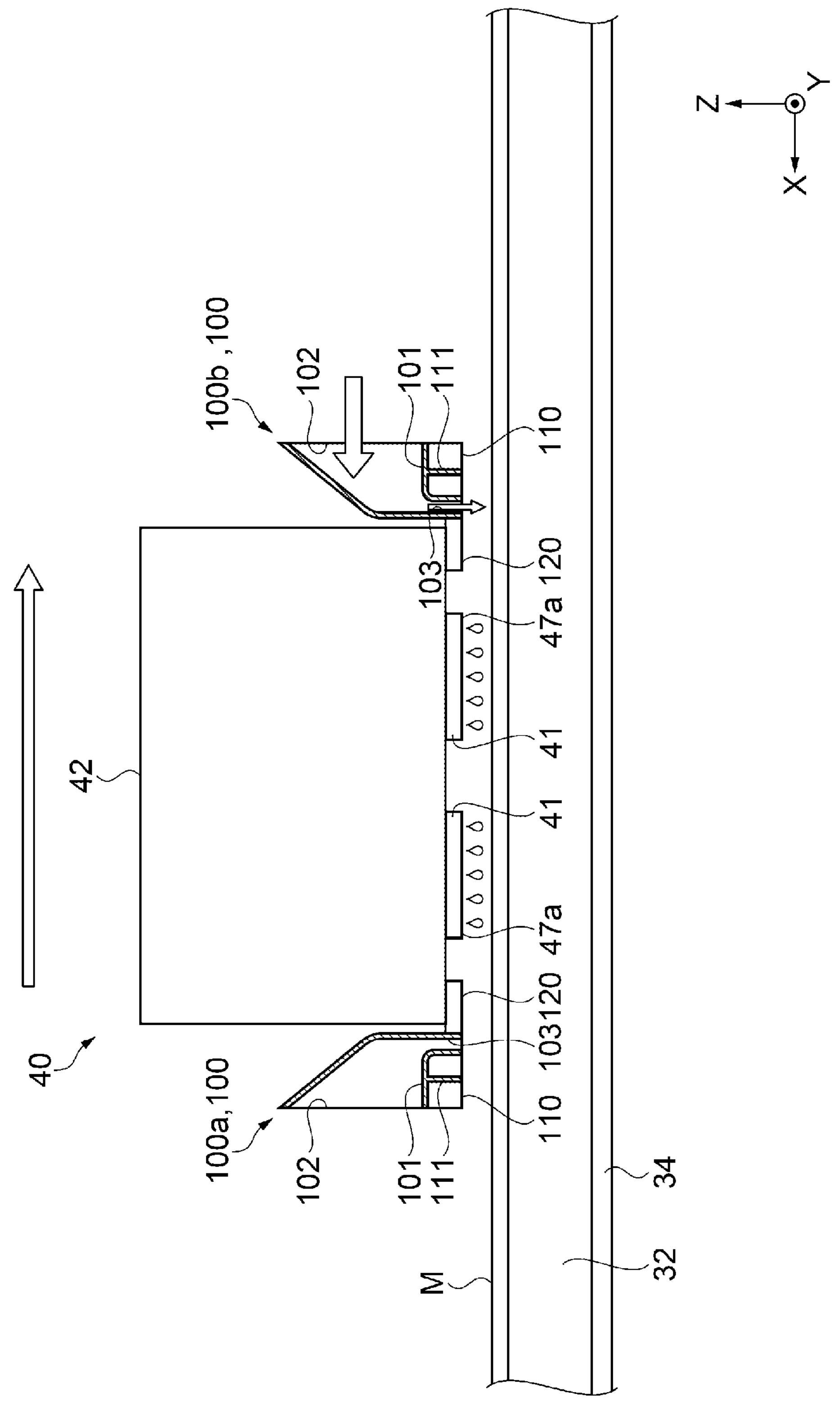
FIG. 3C is a schematic diagram showing operation of the gas guiding section according to the first embodiment.

FIG. 3C shows a case where the head unit 40 is moved in the −X direction. In this case, the gas flows in from the inflow port 102 of the second gas guiding section 100*b*, passes through the flow path 101, and flows out from the outflow port 103. The gas flowing out from the outflow port 103 hits the vapor over the medium M, and the vapor is dispersed and moved.

The second gas guiding section 100*b* has the same operation and effect as the first gas guiding section 100*a*.

Since the gas is blown toward the vapor over the medium M by the first gas guiding section 100*a* and the second gas guiding section 100*b* by moving the head unit 40 in the scanning directions, it is possible to suppress the occurrence of condensation on the nozzle surface 47*a*.

Since the gas is blown from the outflow port 103 toward the medium M, drying of the ink applied to the medium M is promoted.

In the first gas guiding section 100*a* and the second gas guiding section 100*b* of the embodiment, a fan for blowing gas toward the medium M or routing of a cable and the like for driving the fan are not necessary, and thus it is possible to simplify the configuration of the gas guiding section 100.

Furthermore, since there is no vibration or the like due to driving a fan or the like, there is no influence of vibration or the like on the ejection head 41, and it is possible to accurately eject ink.

2. Second Embodiment

Next, a second embodiment will be described. Configuration of the head unit 40A in the present embodiment will be described. Note that the same configuration as in the first embodiment is denoted by the same reference numerals, and redundant description will be omitted.

Figure 4A:
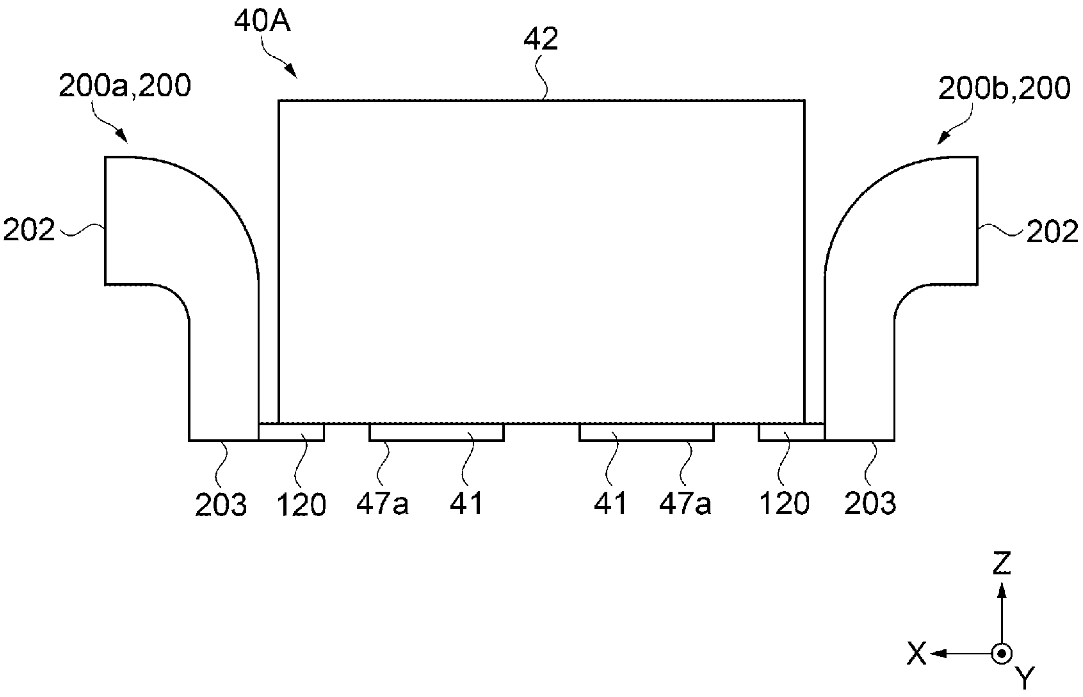
FIG. 4A is a front view showing configuration of a gas guiding section according to a second embodiment.
Figure 4B:
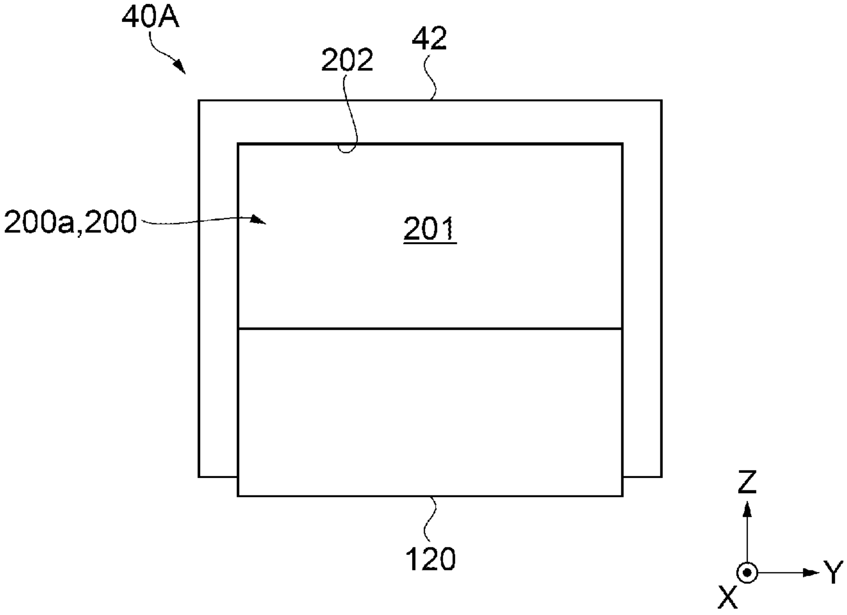
FIG. 4B is a side view showing configuration of the gas guiding section according to a second embodiment.
Figure 4C:
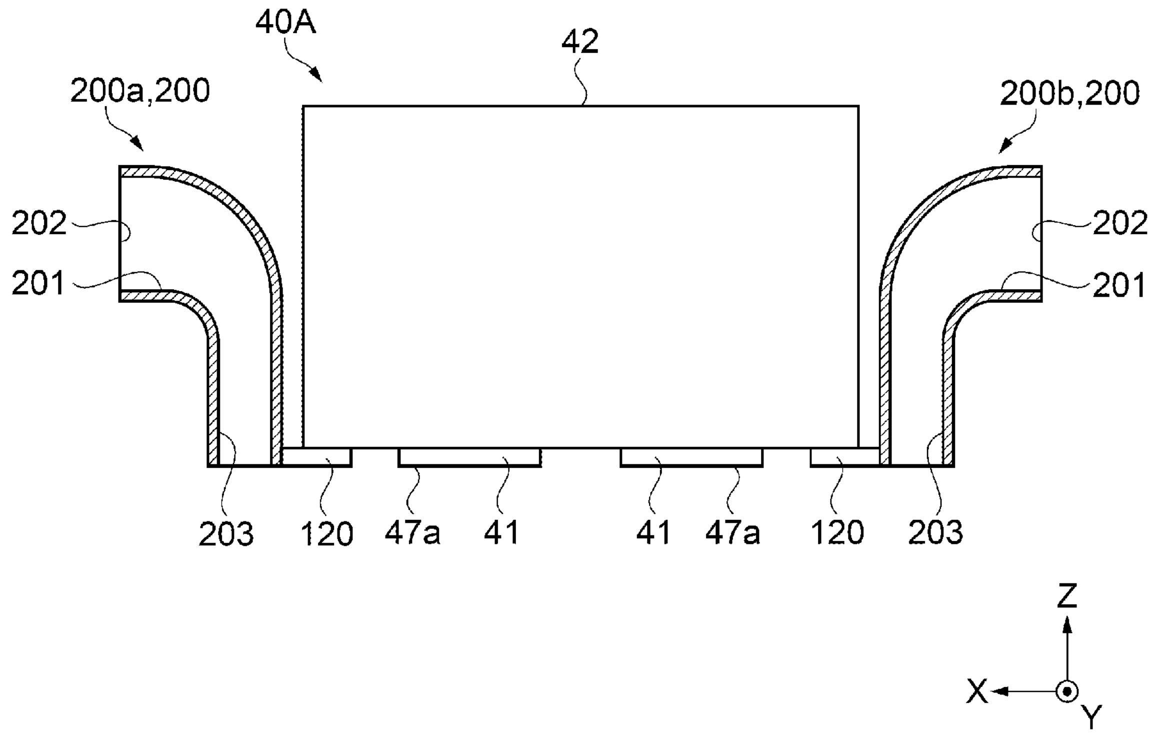
FIG. 4C is a cross-sectional view showing configuration of the gas guiding section according to a second embodiment.

As shown in FIG. 4A, FIG. 4B, and FIG. 4C, the head unit 40A includes a gas guiding section 200. The gas guiding section 200 guides air flow generated by movement of the head unit 40A toward the medium M supported by the platen 32.

The head unit 40A includes two gas guiding sections 200. To be specific, the head unit 40A is provided with a first gas guiding section 200*a* which is provided at an end section in the +X direction of the carriage 42, and a second gas guiding section 200*b* which is provided at an end section in the −X direction. The basic configurations of the first gas guiding section 200*a* and the second gas guiding section 200*b* are the same.

The first gas guiding section 200*a* and the second gas guiding section 200*b* include a flow path 201 through which gas flows. An inflow port 202 into which the gas flows when the head unit 40A moves is disposed at one end of the flow path 201. An outflow port 203 through which the gas that flowed in from the inflow port 202 is ejected is disposed at the other end of the flow path 201.

The inflow port 202 has a rectangular shape as viewed in the −X direction (FIG. 4B). The outflow port 203 has a rectangular shape as viewed in the +Z direction.

The inflow port 202 opens in the movement direction in which the head unit 40A moves. To be specific, the inflow port 202 of the first gas guiding section 200*a* is opened toward the +X direction. The inflow port 202 of the second gas guiding section 200*b* opens in the −X direction.

The inflow port 202 of the embodiment is disposed at the center section of the carriage 42 in the direction along the Z axis or spanning to the +Z direction from the center section. That is, it is disposed at a position separated away from the platen 32.

The outflow port 203 is open toward the medium M. That is, the outflow port 203 is opened toward the platen 32 side (−Z direction).

The inflow port 202 is disposed in front of the outflow port 203 in the movement direction. To be specific, in the first gas guiding section 200*a*, the inflow port 202 is arranged further in the +X direction than is the outflow port 203. On the other hand, in the second gas guiding section 200*b*, the inflow port 202 is arranged further in the −X direction than is the outflow port 203. By this, it is possible to efficiently perform the inflow operation and the outflow operation of the gas.

The flow path 201 of the present embodiment bends from the direction along the X axis toward the direction along the Z axis from the inflow port 202 toward the outflow port 203. Therefore, gas flowing in from the direction along the X axis via the inflow port 202 flows through the flow path 201 and is guided toward the −Z direction via the outflow port 203.

The opening area of the inflow port 202 may be substantially the same as the opening area of the outflow port 203. For example, the ratio of the opening area of the outflow port 203 to the opening area of the inflow port 202 is 50% to 100%. By this, the pressure loss of the gas flowing through the flow path 201 is reduced, and the air flow volume of the gas flowing out from the outflow port 203 can be increased.

The first gas guiding section 200*a* and the second gas guiding section 200*b* have a guard section 120 that protects the nozzle surface 47*a* in which the nozzles 48 are formed. The configuration of the guard section 120 is the same as that of the first embodiment.

Note that the outer surface of the flow path 201 below the inflow port 202 in the first gas guiding section 200*a* and the second gas guiding section 200*b* is flat along the YZ plane. That is, the gas guiding section 200 of the present embodiment has a configuration in which the air flow control section 110 (first embodiment) is omitted.

Next, the operations and effects of the first gas guiding section 200*a* and the second gas guiding section 200*b* will be described.

In the head unit 40A (the first gas guiding section 200*a* and the second gas guiding section 200*b*) of the embodiment, the air volume of the gas that flows out from the outflow port 203 is increased compared to the first embodiment, and the humidity over the medium M can be reduced by sending gas having a relatively small amount of vapor into the space separated from the medium M, thereby suppressing condensation on the nozzle surface 47*a*.

Figure 5A:
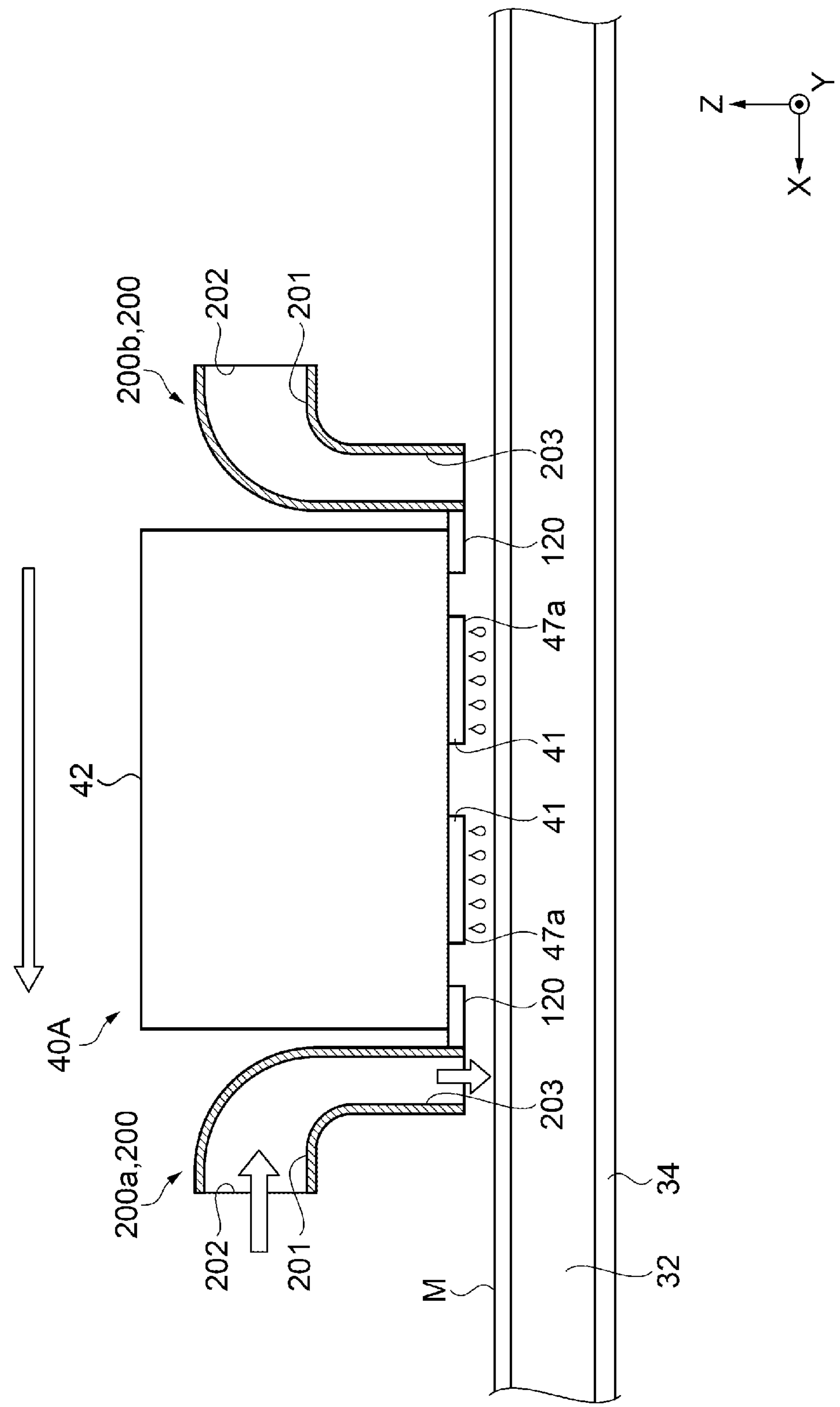
FIG. 5A is a schematic view showing operation of the gas guiding section according to the second embodiment.

As shown in FIG. 5A, in a case where the head unit 40A is moved in the +X direction, gas flows in from the inflow port 202 of the first gas guiding section 200*a*, passes through the flow path 201, and flows out from the outflow port 203.

The inflow port 202 is disposed at a position separated from the medium M in a direction along the Z axis. The vicinity of the medium M contains vapor so relative humidity is high, but the relative humidity decreases in the +Z direction from the medium M. This allows the inflow port 202 to introduce gas with lower relative humidity. Therefore, gas having a low relative humidity flows out from the outflow port 203. By this, since the high humidity atmosphere of the space between the medium M and the head unit 40A is diluted, it is possible to suppress the occurrence of dew condensation on the nozzle surface 47*a*.

Figure 5B:
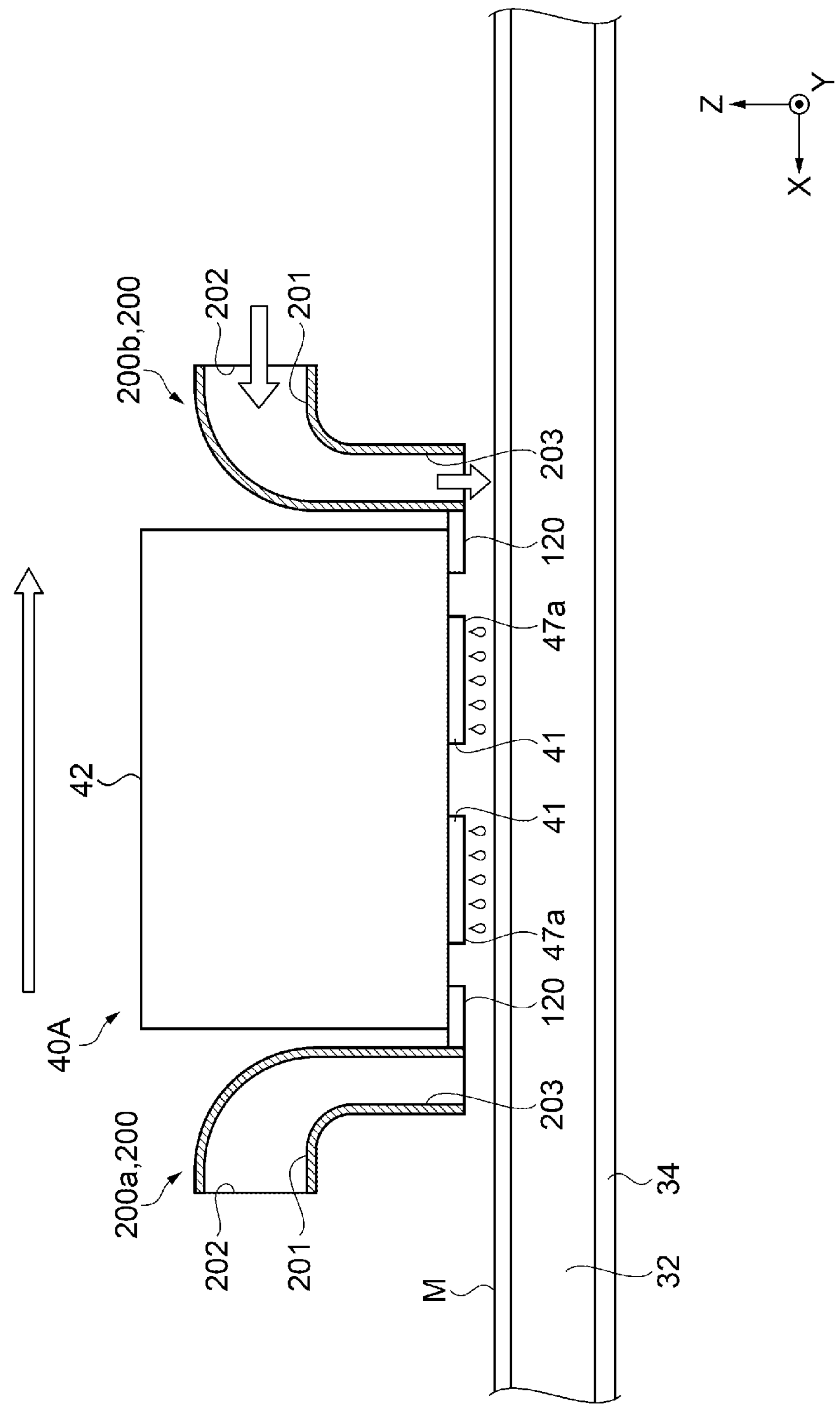
FIG. 5B is a schematic view showing operation of the gas guiding section according to the second embodiment.

FIG. 5B shows a case where the head unit 40A is moved in the −X direction. In this case, the gas flows in from the inflow port 202 of the second gas guiding section 200*b*, passes through the flow path 201, flows out from the outflow port 203, and the humidity near the medium M is diluted.

The second gas guiding section 200*b* has the same operations and effects as the first gas guiding section 200*a*.

By moving the head unit 40A in the scanning direction, the high humidity atmosphere over the medium M is diluted by the air flow guided via the first gas guiding section 200*a* and the second gas guiding section 200*b*, and a low humidity atmosphere is formed. By this, the occurrence of dew condensation on the nozzle surface 47*a* can be suppressed.

Other effects of the present embodiment are the same as those of the first embodiment.

3. Third Embodiment

Next, a third embodiment will be described. In the present embodiment, configuration of a gas guiding section 300 of a head unit 40B will be described. Note that the same configuration as in the second embodiment is denoted by the same reference numerals, and redundant description will be omitted.

Figure 6:
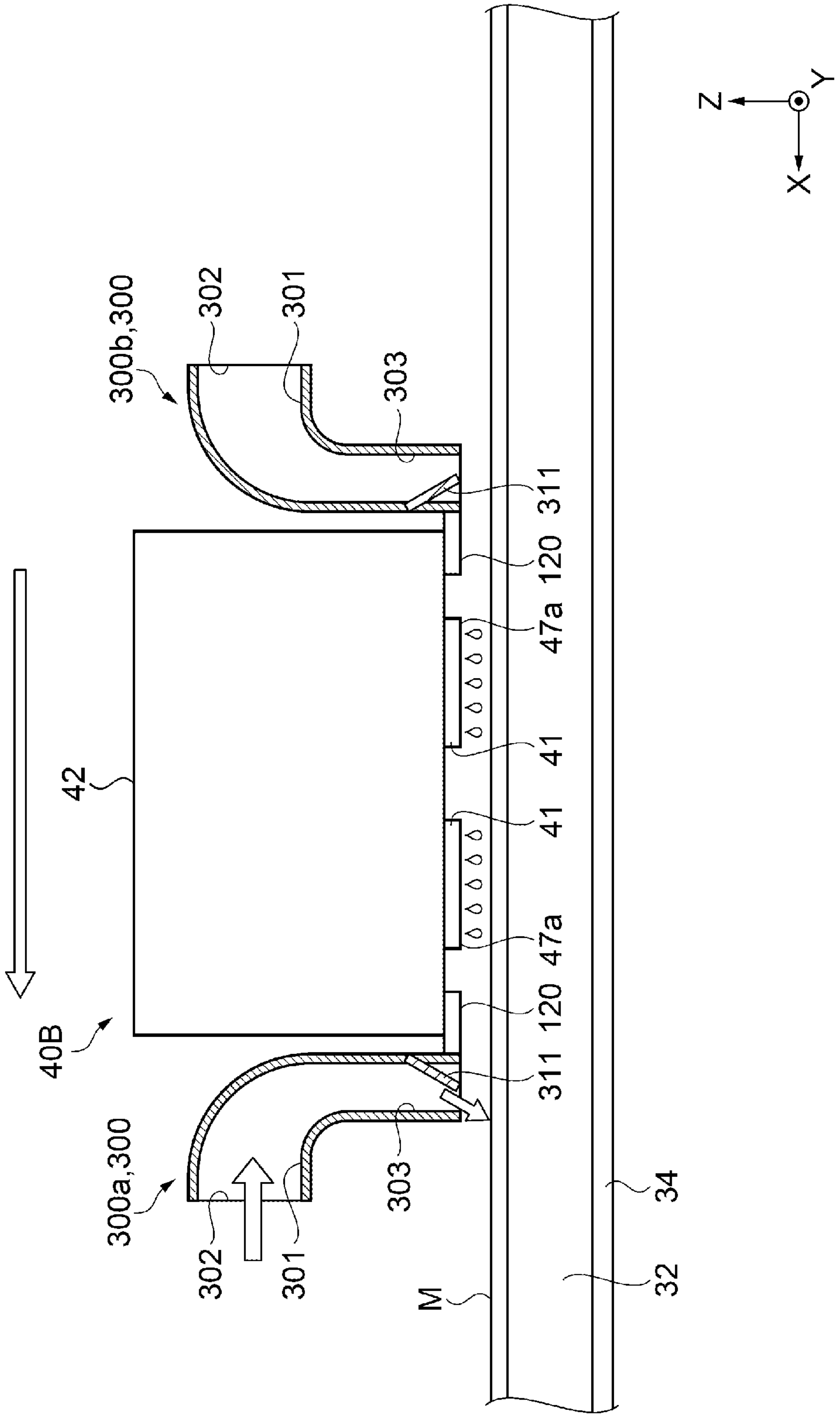
FIG. 6 is a cross-sectional view showing configuration of a gas guiding section according to a third embodiment.

As shown in FIG. 6, the head unit 40B includes a gas guiding section 300. Two gas guiding sections 300 are arranged. To be specific, a first gas guiding section 300*a* is disposed at the +X direction end section of the carriage 42 and a second gas guiding section 300*b* is disposed at the −X direction end section of the carriage 42. The basic configurations of the first gas guiding section 300*a* and the second gas guiding section 300*b* are the same.

The first gas guiding section 300*a* and the second gas guiding section 300*b* include a flow path 301 through which gas flows. An inflow port 302 into which the gas flows when the head unit 40B moves is disposed at one end of the flow path 301. An outflow port 303 through which the gas that flowed in from the inflow port 302 is ejected is disposed at the other end of the flow path 301.

Further, a louver 311 is disposed at the outflow port 303 of each of the first gas guiding section 300*a* and the second gas guiding section 300*b*.

Note that configuration other than the louver 311 is the same as in the second embodiment.

The louver 311 regulates the direction of gas flowing out from the outflow port 303. The louver 311 of the present embodiment regulates the direction of gas flowing out from the outflow port 303 in a direction away from the ejection head 41.

The louver 311 is a plate-like member and extends in a direction along the Y axis of the outflow port 303. The louver 311 of the first gas guiding section 300*a* extends gradually in the +Z direction and toward the −X direction, and has a flat surface that intersects the X axis and the Z axis. The louver 311 of the second gas guiding section 300*b* extends gradually in the +Z direction and toward the +X direction, and has a flat surface that intersects the X axis and the Z axis.

As shown in FIG. 6, in a case where the head unit 40B is moved in the +X direction, gas flows in from the inflow port 302 of the first gas guiding section 300*a*, passes through the flow path 301, and flows out from the outflow port 303.

The gas flowing out from the outflow port 303 flows along the louver 311. In the present embodiment, the gas flows out from the outflow port 303 toward the +X direction. That is, the gas flows in a direction away from the ejection head 41. By this, vapor over the medium M can be efficiently blown away from the periphery of the ejection head 41 and condensation on the nozzle surface 47*a* can be suppressed. Note that also in a case where the head unit 40B is moved in the −X direction, the same operation and effect as described above are obtained.

The louver 311 may be provided in the head unit 40 according to the first embodiment.

4. Fourth Embodiment

Next, a fourth embodiment will be described. In the present embodiment, configuration of the gas guiding section 400 of the head unit 40C will be described. Note that the same configuration as in the second embodiment is denoted by the same reference numerals, and redundant description will be omitted.

Figure 7:
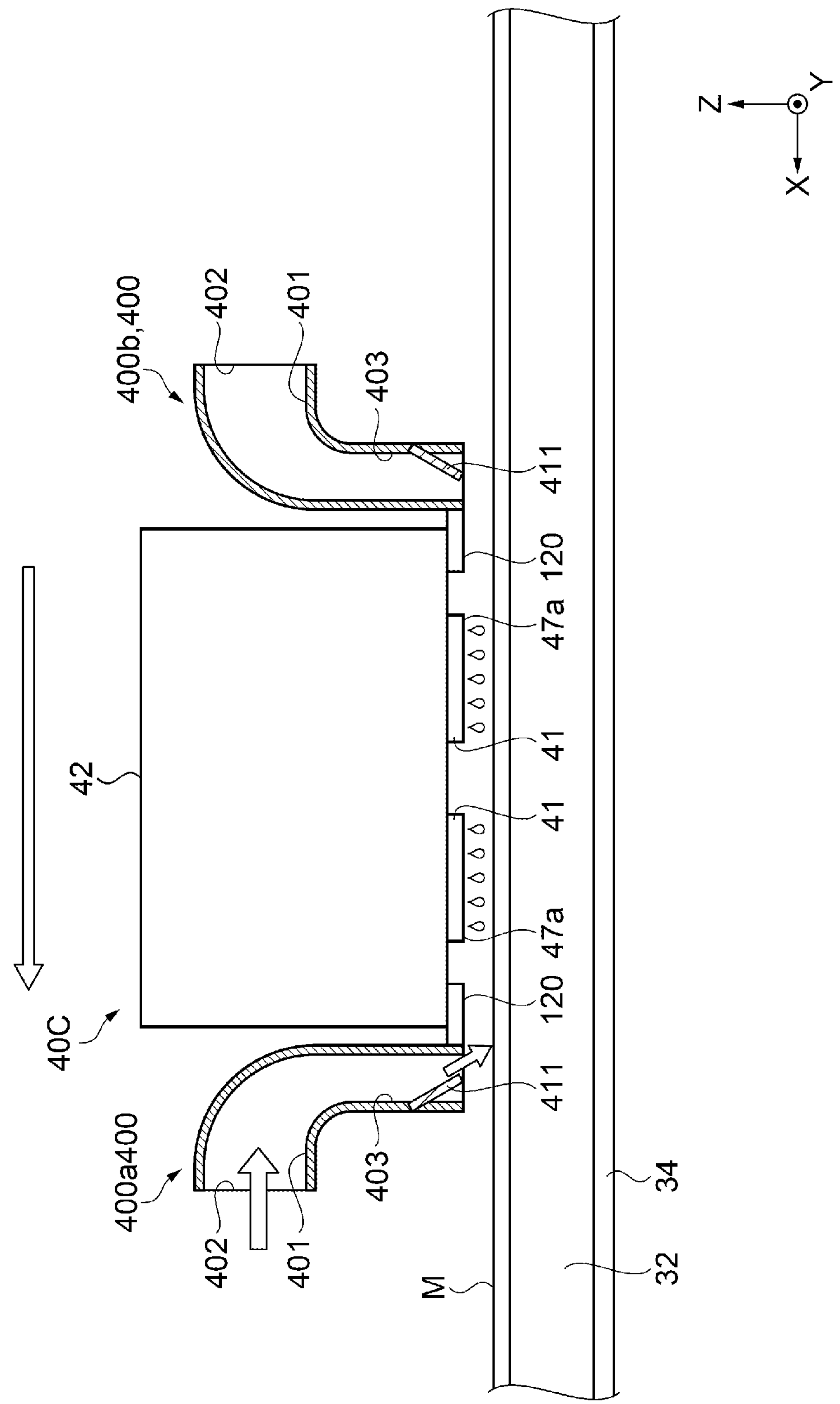
FIG. 7 is a cross-sectional view showing configuration of a gas guiding section according to a fourth embodiment.

As shown in FIG. 7, the head unit 40C includes a gas guiding section 400. Two gas guiding sections 400 are arranged. To be specific, a first gas guiding section 400*a* is disposed at the +X direction end section of the carriage 42 and a second gas guiding section 400*b* is disposed at the −X direction end section of the carriage 42. The basic configurations of the first gas guiding section 400*a* and the second gas guiding section 400*b* are the same.

The first gas guiding section 400*a* and the second gas guiding section 400*b* include a flow path 401 through which gas flows. An inflow port 402 into which the gas flows when the head unit 40C moves is disposed at one end of the flow path 401. An outflow port 403 through which the gas that flowed in from the inflow port 402 is ejected is disposed at the other end of the flow path 401.

Further, a louver 411 is disposed at the outflow port 403 of each of the first gas guiding section 400*a* and the second gas guiding section 400*b*.

Note that configuration other than the louver 411 is the same as that of the second embodiment.

The louver 411 regulates the flow direction of gas flowing out from the outflow port 403. The louver 411 of the present embodiment regulates the gas flowing out from the outflow port 403 in a direction in which the gas flows to the ejection head 41 side.

The louver 411 is a plate-like member and extends in a direction along the Y axis of the outflow port 403. The louver 411 of the first gas guiding section 400*a* extends gradually in the −Z direction and toward the −X direction, and has a flat surface that intersects the X axis and the Z axis. The louver 411 of the second gas guiding section 400*b* extends gradually in the −Z direction and toward the +X direction, and has a flat surface that intersects the X axis and the Z axis.

As shown in FIG. 7, in a case where the head unit 40C is moved in the +X direction, gas flows in from the inflow port 402 of the first gas guiding section 400*a*, passes through the flow path 401, and flows out from the outflow port 403.

The gas flowing out from the outflow port 403 flows along the louver 411. In the present embodiment, the gas flows out from the outflow port 403 toward the −X direction. That is, the gas flows to the ejection head 41 side. By this, the relative humidity over the medium M decreases, and the dew condensation on the nozzle surface 47*a* can be suppressed. Note that also in a case where the head unit 40C is moved in the −X direction, the same operations and effects as described above are obtained.

Further, the louver 411 may be provided in the head unit 40 according to the first embodiment.

What is claimed is:

1. A printing device comprising:

a head unit that includes a nozzle and that ejects liquid from the nozzle toward a medium;

a heater that heats the medium to which the liquid was applied; and a head unit moving section configured to move the head unit, wherein the head unit includes a gas guide that guides air flow generated by the movement of the head unit toward the medium;

the head unit moving section is configured to move the head unit in a first direction and in a second direction, which is a direction opposite to the first direction;

the gas guide includes a first gas guide provided at an end section of the head unit in the first direction and a second gas guide provided at an end section of the head unit in the second direction;

the first gas guide and the second gas guide have an inflow port into which gas flows and an outflow port out of which flows gas that flowed into the inflow port;

the inflow port opens facing a movement direction in which the head unit moves and the outflow port opens facing the medium; and the first gas guide and the second gas guide include an air flow control surface that is disposed below the inflow port and that controls direction of air flow generated by the movement of the head unit.

2. The printing device according to claim 1, wherein an opening area of the inflow port is larger than an opening area of the outflow port.

3. The printing device according to claim 1, wherein the inflow port is disposed in front of the outflow port in the movement direction.

4. The printing device according to claim 1, wherein the first gas guide and the second gas guide have a guard that protects a nozzle surface of a nozzle plate in which the nozzle is formed and the guard is disposed at the same height position as the nozzle surface.

5. A printing device comprising:

a head unit that includes a nozzle and that ejects liquid from the nozzle toward a medium;

a heater that heats the medium to which the liquid was applied; and a head unit moving section configured to move the head unit, wherein the head unit includes a gas guide that guides air flow generated by the movement of the head unit toward the medium the head unit moving section is configured to move the head unit in a first direction and in a second direction, which is a direction opposite to the first direction;

the gas guide includes a first gas guide provided at an end section of the head unit in the first direction and a second gas guide provided at an end section of the head unit in the second direction;

the first gas guide and the second gas guide have an inflow port into which gas flows and an outflow port out of which flows gas that flowed into the inflow port;

the inflow port opens facing a movement direction in which the head unit moves and the outflow port opens facing the medium; and the first gas guide and the second gas guide have a guard that protects a nozzle surface of a nozzle plate in which the nozzle is formed and the guard is disposed at the same height position as the nozzle surface.

6. The printing device according to claim 5, wherein an opening area of the inflow port is larger than an opening area of the outflow port.

7. The printing device according to claim 5, wherein the first gas guide and the second gas guide include an air flow control surface that is disposed below the inflow port and that controls direction of air flow generated by the movement of the head unit.

8. The printing device according to claim 5, wherein the inflow port is disposed in front of the outflow port in the movement direction.

* * * * *